Aug. 24, 1965  H. FLIEGNER ET AL  3,202,778
APPARATUS FOR DETECTING ARTICLES OF MAXIMUM
STIFFNESS, THICKNESS, OR LENGTH
Filed Dec. 27, 1962  2 Sheets-Sheet 1

INVENTORS.
HORST FLIEGNER
HORST BRAUSE
BY
ATTORNEY

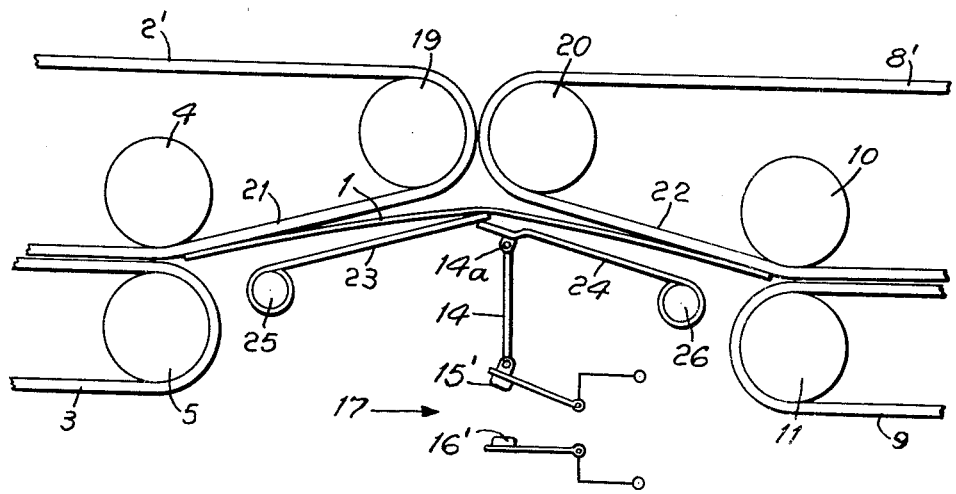
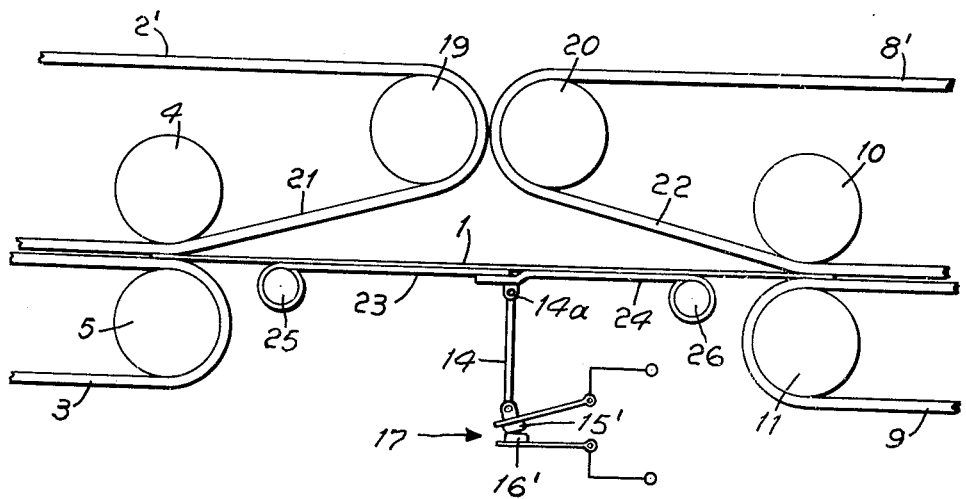

United States Patent Office 3,202,778
Patented Aug. 24, 1965

3,202,778
APPARATUS FOR DETECTING ARTICLES OF MAXIMUM STIFFNESS, THICKNESS, OR LENGTH
Horst Fliegner, Berlin-Zehlendorf, and Horst Brause, Hagen, Germany, assignors to International Standard Electric Corporation, New York, N.Y., a corporation of Delaware
Filed Dec. 27, 1962, Ser. No. 252,013
Claims priority, application Germany, Jan. 4, 1962, St 18,736
4 Claims. (Cl. 209—61.41)

This invention relates to apparatus for testing articles according to their length, thickness, and flexibility and more particularly to apparatus for testing documents such as articles of mail.

When heterogeneous documents are to be mechanically processed, particularly articles of mail, it is necessary to eliminate all items which do not lend themselves to such processing because of excessive stiffness, thickness, and in some instances, length. There are many known automatic mechanical arrangements for presorting documents to be processed. One known device for testing stiffness guides the documents to an arrangement which applies a specific bending force to the documents. The ones which fail to bend because of excessive stiffness are sorted out of the system. In a known arrangement for excluding documents exceeding a maximum thickness the documents are passed through a trough which is narrowed down by means of a laterally sliding barrier to the maximum desired thickness. Documents which exceed the desired thickness brush the barrier aside and actuate a control mechanism which effectively sorts out the undesired documents. Systems for excluding documents exceeding a desired maximum length usually have indicators arranged adjacent a conveyor trough and spaced apart a distance equal to the desired maximum length. When a document is simultaneously acted on by both indicators, a control is activated. These indicators may comprise mechanically actuated contacts or photoelectric cells.

To date, the three tasks of detecting excessive stiffness, thickness, and length have required three separate arrangements. These arrangements have suffered from a number of drawbacks in that they fail to function with sufficient accuracy and also require considerable equipment, particularly electronic components. For instance, in one known arrangement for testing stiffness, perforated conveyor belts are passed over vacuum nozzles around a bend in the conveying path so that documents will be drawn to the belt. Those which do not follow the bend due to their stiffness are sorted out of the system. However, documents which are excessively stiff only in one portion are found to be sufficiently pliable to traverse the bend while flexible items which, due to the nature of their outer surface, do not let the vacuum arrangement function to its fullest effect, are often sorted out. The use of a vacuum source requires an additional high investment and usually noisy operation. It is not possible with such an arrangement to simultaneously sort items exceeding a desired thickness and/or length if they are sufficiently flexible.

It is therefore an object of this invention to provide a device for simultaneously testing the thickness and flexibility of articles in one operation.

It is another object of this invention to provide apparatus for simultaneously testing the length, thickness, and flexibility of articles in one operation.

It is another object of this invention to provide apparatus for testing articles according to length, thickness, and flexibility which requires a minimum of equipment and is more reliable than present systems.

It is a further object of this invention to provide apparatus for testing articles according to their length, thickness, and flexibility while they remain in the conveyor path of the processing system.

A feature of this invention is the provision of a device for bending articles between a first and second plate which are curved perpendicular to the forwarding direction of the article conveyor path. The first plate is fixedly supported to form one side of the conveyor path. The second plate is resiliently disposed adjacent and parallel to the first plate and cooperates with it to guide articles around the bend formed between them as they pass from an input conveyor system to an output conveyor system. When excessively thick articles and/or excessively stiff ones move the second plate a predetermined distance away from the first plate a control device is actuated. Also, in the case of documents, the output conveyor may be spaced a desired distance away from the input conveyor, this distance being equal to the maximum length document to be processed. The output conveyor is then run at a speed in excess of the input conveyor so that documents which are longer than the desired length will be drawn rapidly into the output conveyor while being held in the input conveyor to effectively "stretch" and stiffen the document so that the control is actuated.

Another feature of our invention is an arrangement including a first and second parallel conveyor for feeding articles into a device in accordance with our invention and a third and fourth parallel conveyor for removing the articles. The device is disposed between the first input and the third output conveyors and adjacent to a portion of one of the second input and the fourth output conveyors. The device includes tensioned pivoted plates which tend to bend articles as they move from the input to the output conveyors. Articles exceeding a desired thickness or having less than a prescribed flexibility will move these plates and actuate a control mechanism. Also, the distance between the input and output conveyors in which the plates are arranged, may be made equal to the maximum length of desired documents such as articles of mail. This length will include the bent length of desired articles of mail as those which do not bend will be ejected from the system anyway. The output conveyors will then be driven at a higher rate than the input conveyors so that letters exceeding the desired length will be stiffened to cause the metal plates to actuate the control.

The above-mentioned and other features and objects of this invention will become apparent by reference to the following description taken in conjunction with the accompanying drawings, in which:

FIGURE 3 is a schematic illustration of another embodiment of our invention, and FIGURE 4 is a schematic illustration of the embodiment of FIGURE 3 in which an undesired document is being fed through our device.

Figure 1:
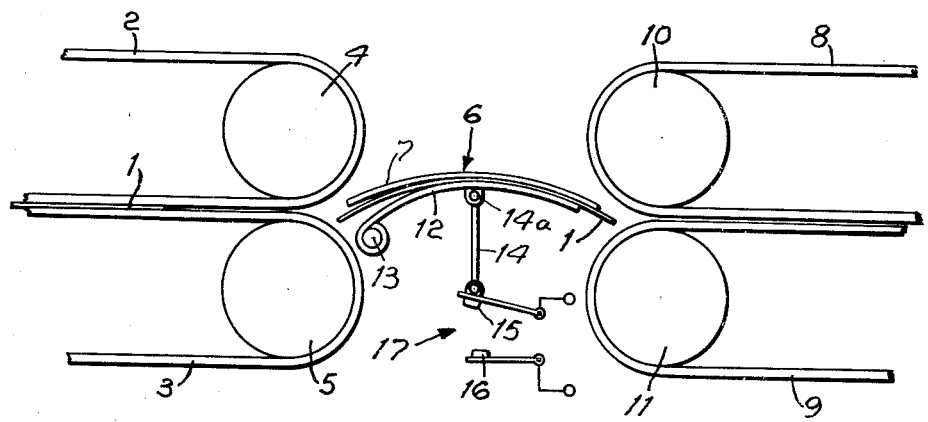
FIGURE 1 is a schematic illustration of apparatus in accordance with our invention.

Referring now to FIGURE 1 in which there is disclosed one embodiment of our invention. Documents 1 are fed via edgewise conveyors 2 and 3 between rollers 4 and 5 to the device 6 for detecting documents which exceed a desired stiffness or width. A fixed bent plate 7 serves to guide documents from the input conveyors 2 and 3 to the output conveyors 8 and 9 through rollers 10 and 11. Plate 12 is pivotally mounted at 13 by means including springs so that it is resiliently held adjacent plate 7. Rod 14 which is hingedly connected to plate 12 at 14a couples it to contact 15. The distance between contact 15 and contact 16 is chosen so that articles exceeding a desired thickness will force plate 12 to cause contact 15 to make a connection with contact 16. The resilience of the springs is determined by the maximum stiffness of desired documents. Switch 17 activates a control circuit (not shown) which will eject articles which trip the switch out of the system. There are many well-known control circuits for this purpose and they do not form a part of this invention.

Figure 2:
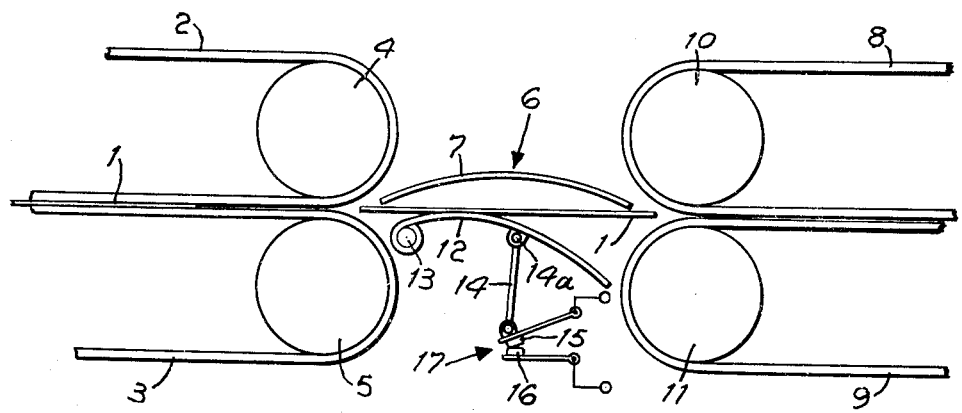
FIGURE 2 is a schematic illustration of the apparatus of FIGURE 1 in which an undesired document is being passed through our device.

In FIGURE 2 it can be seen that an article having excessive thickness will cause a connection to be made by switch 17. If it is also desired to sort articles according to length, the input conveyors 2 and 3 are spaced the desired length away from the output conveyors 8 and 9. This length includes the bent length of an article according to the path along plate 6. The output conveyors 8 and 9 are driven at a faster rate than the input conveyors 2 and 3. Thus, flexible articles which are longer than the gap between the two conveyor systems will be stretched and stiffened to activate switch 17.

Referring now to FIGURE 3 in which there is disclosed another arrangement in accordance with our invention. Instead of a metal guide plate such as plate 7 in FIGURE 1, edgewise conveyors 2' and 8' are guided around rollers 19 and 20 respectively and the portions 21 and 22 serve to guide articles from the input to the output conveyors. Two overlaping metal plates 23 and 24 are pivotally mounted at 25 and 26, respectively by spring means (not shown) so that they are urged towards the conveyor portions 21 and 22 respectively by a force corresponding to the maximum stiffness of desired documents. Contact 15' is spaced apart from contact 16' a distance which corresponds to the maximum thickness desired. Articles which exceed the maximum allowable stiffness and/or thickness will cause the switch 17 to be activated. Also, the input and output conveyors may be spaced apart a specific distance and the output conveyors driven at a higher rate than the input conveyors so that documents exceeding a desired length will cause switch 17 to be activated. In FIGURE 4 a document which is too long has been stiffened to close switch 17 regardless of its flexibility.

As can be seen by the preceding examples, our arrangements can be adapted to detect when a document is either too stiff, too long, or more thick than desired. The pivoted plates are tensioned to bend documents which do not exceed a maximum stiffness. The contacts are spaced apart a specific distance so that articles which are too thick will cause the switch to be activated even if they are flexible enough to be bent by the tensioned plate. Finally, all articles exceeding a desired length are detected by spacing the input and output conveyors a predetermined distance apart and driving the output conveyors faster than the input conveyors so that long items which are thin enough and flexible enough will be stiffened to force the switch to be activated.

While we have described above the principles of our invention in connection with specific apparatus, it is to be clearly understood that this description is made only by way of example and not as a limitation to the scope of our invention as set forth in the objects thereof and in the accompanying claims.

What is claimed is:

1. Apparatus for testing articles according to length comprising:
    input means with fully positive traction for moving said articles into said apparatus at a predetermined rate;
    output means for withdrawing said articles from said apparatus at a faster rate than said predetermined rate, and placed a distance from said input means which corresponds to the maximum allowable length of said articles;
    guiding means interposed between said input and output means to guide said articles from said input means to said output means;
    resilient means cooperating with said guiding means to bend each of said articles in a same prescribed arched disposition; and
    sensing means responsive to said resilient means for indicating displacement of said resilient means by articles of excessive length.

2. Apparatus for testing articles according to stiffness, thickness, or length comprising:
    input means with fully positive traction for moving said articles into said apparatus at a predetermined rate;
    output means for withdrawing said articles from said apparatus at a faster rate than said predetermined rate, and adjustably placed a distance from said input means which corresponds to the maximum allowable length of said articles;
    guiding means interposed between said input and output means to guide said articles from said input means to said output means;
    said input and output means, and said guiding means, extending in the same horizontal plane;
    resilient means parallel to and urged against said guiding means to cooperate with said guiding means to bend each of said articles conveyed therebetween in a same prescribed arched disposition; and
    sensing means responsive to said resilient means for indicating displacement of said resilient means by articles of excessive stiffness, thickness, or length.

3. Apparatus for testing articles according to stiffness, thickness, or length comprising:
    input means with fully positive traction for moving said articles into said apparatus at a predetermined rate;
    output means for withdrawing said articles from said apparatus at a faster rate than said predetermined rate, and adjustably placed a distance from said input means which corresponds to the maximum allowable length of said articles;
    said input and output means being extended in the same horizontal plane;
    resilient means interposed between said input and output means to cooperate with a portion of said input means and a portion of said output means to bend each of said articles conveyed between said input and output means in a same prescribed arched disposition; and
    sensing means responsive to said resilient means for indicating displacement of said resilient means by articles of excessive stiffness, thickness, or length.

4. Apparatus for testing flexible articles according to a prescribed limitation of stiffness comprising:
    input means for moving said articles into said apparatus;
    output means for withdrawing said articles from said apparatus;
    guiding means for guiding said articles from said input means to said output means, said input and output means, and said guiding means, extending in the same plane;
    resilient means parallel to and urged against said guiding means to cooperate with said guiding means to bend each of said articles conveyed therebetween in a same prescribed arched disposition, said resilient means being selectively determined to correspond to a range of flexibility extending from limitless flexibility at one end to a predetermined degree of stiffness at the other end, said predetermined degree being the minimum allowable degree of flexibility; and sensing means responsive to said resilient means for indicating displacement of said resilient means by articles of greater stiffness than said prescribed limitation of stiffness.

References Cited by the Examiner
UNITED STATES PATENTS
2,670,954   3/54   Bach _____ 271—57

BERNARD A. GILHEANY, *Primary Examiner.*